Sept. 1, 1931.     W. E. PHILIPS     1,821,235
ROLL FOR BELT IDLERS
Filed April 13, 1928

Inventor
William E. Philips
by Parker & Curts
Attorneys

Patented Sept. 1, 1931

1,821,235

UNITED STATES PATENT OFFICE

WILLIAM E. PHILIPS, OF CHICAGO, ILLINOIS, ASSIGNOR TO THE LINK-BELT COMPANY, OF CHICAGO, ILLINOIS, A CORPORATION OF ILLINOIS

ROLL FOR BELT IDLERS

Application filed April 13, 1928. Serial No. 269,782.

My invention relates to improvements in idler rolls for belt conveyor and the like, and has for one object to provide a new and improved form of roll which will be generally non-skid in character and tend to prevent or limit lateral displacement of the belt along the supporting idlers. Another object is to provide rolls which will have a surface calculated to offer increased frictional resistance against slipping movement of the belt so as to insure to as great an extent as possible that the walls of the idler will be moved by the belt at substantially the same peripheral speed as the linear speed of the belt. Other objects will appear from time to time in the specification and claims.

It will be understood that any conveyor belt must always be supported by single or multiroll idlers which will carry or support the belt between its centers in a generally continuous line, so that the belt may be enabled to properly carry its burden. Experience shows that if the belt is troughed by troughing idlers, and if it happens that the load is deposited on the belt eccentrically, there is a very marked tendency to creep to one side and get out of correct alignment. Then as it approaches the end pulley special means have to be provided to force the belt back into line, such means always adding to the power required, and since they are likely to have to engage the unsupported edge of the belt they are likely to result in great increase of the wear and damage to the belt.

Another problem arising in connection with belt conveyors comes from the fact that the idler rolls which are driven by contact with the under surface of the belt, and which have but a very narrow arc of contact with the belt, tend to travel at a peripheral speed which is appreciably slower or less than the longitudinal speed of the belt, and means are provided in my invention tending to maintain the peripheral speed and the longitudinal speed generally constant, thereby preventing frictional wear between the belt and the rolls which otherwise wears the belt and the rolls, it being understood that it is easy enough to lubricate the fixed and moving parts of the idler so that they last indefinitely, but quite impossible to lubricate the underside of the belt or roller face to prevent wear when their speeds are radically different.

It has been suggested to coat the face of the roller with rubber for the purpose of protecting it and giving a better contact between the rubber of the roller and the conveyor belt, but such a roll construction as this is expensive, increases the weight of the rolls. I propose to corrugate or emboss the face of the roller, preferably doing this by providing a series of spiral channels extending in opposite or intersecting directions about the face of the roll, so as to divide the face up into a series of diamond shaped lugs or projections, there being a channel surrounding each such lug.

Since these channels which are inclined to the axis of the roll intersect in opposite directions, there is no tendency for them to guide the belt laterally with respect to the roll, and the belt is free to travel along the roll in the usual manner, being engaged by these projections to insure a driving contact between the roll and the belt which will maintain their peripheral speed substantially the same as the linear speed of the belt and prevent or at least largely minimize slipping or concomitant wear.

My invention is illustrated more or less diagrammatically in the accompanying drawings, wherein—

Like parts are indicated by like characters throughout the specification and drawings.

Figure 1:
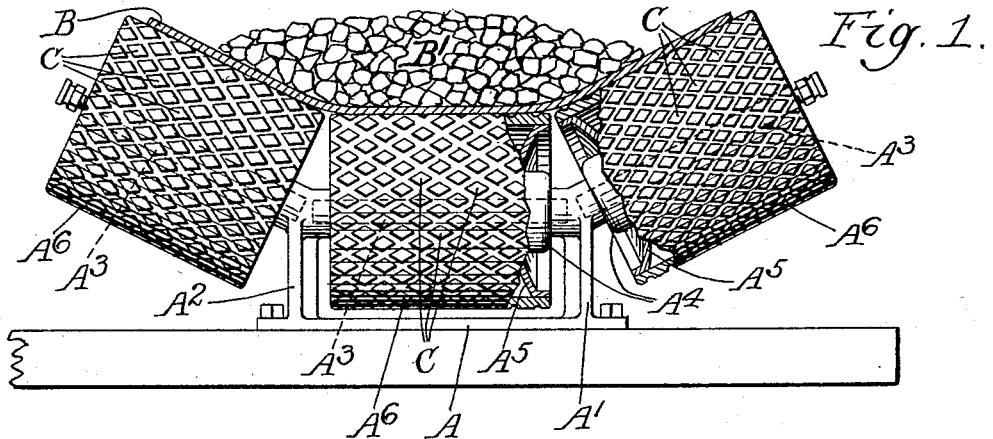
Figure 1 is a side elevation in part section.
Figure 4:
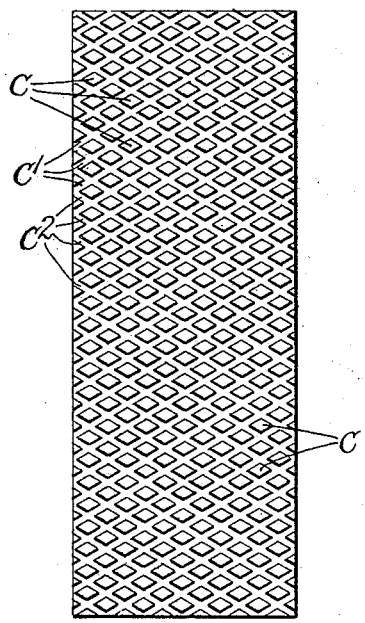
Figure 4 is a developed plan of the face of the roller or pulley.
Figure 2:
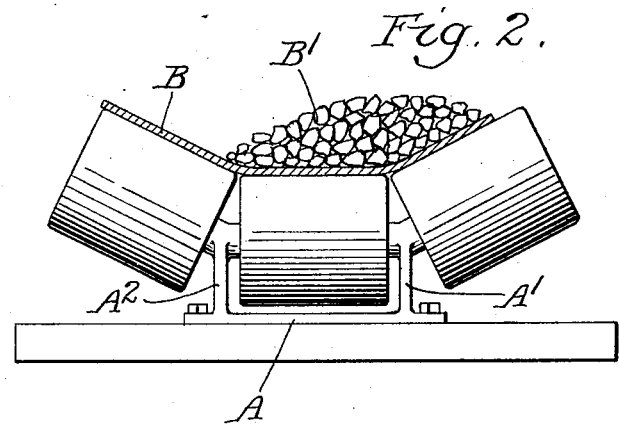
Figure 2 is a view similar to Figure 1 showing the effect of an eccentrically loaded belt.
Figure 3:
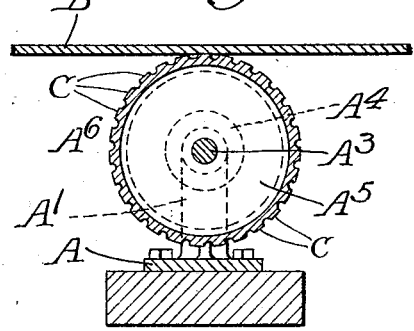
Figure 3 is a longitudinal section through the belt.

A is a supporting base, $A^1$ $A^2$ are brackets projecting upwardly therefrom carrying pulley shafts $A^3$, there being anti-friction bearings $A^4$ $A^4$ between the ends of the shafts and the heads $A^5$ of the roller $A^6$, the roll being cylindrical and the heads being welded or otherwise attached to the two ends of the roll.

B is a conveyor belt troughed and supported by the roll and driven in any suitable manner by a course of power applied to a pulley not here shown. $B^1$ is a burden or load of loose material carried by the belt. Means for applying this material to the belt and for discharging it therefrom form no part of my invention and are therefore not illustrated here.

The working face of the roll is divided up into a plurality of upwardly projecting diamond or otherwise shaped projections C, formed in the face or periphery of the roll by a series of oppositely disposed channels $C^1$ $C^2$. By this arrangement each projection is provided with a plurality of boundary lines adapted to contact a belt traveling parallel or diagonally across a roll. These lines in one form of the device are all four of them inclined to the axis of the pulley and to the axis of the belt and to the axis of travel of the belt, so that they gradually engage the belt without shock or undue vibration. They do tend to keep the belt centered on the idler, however, because of the interrelation between the belt and the groups of diagonal short working edges. As the belt tends to move from one side or the other, the rolls tend to tighten it up against one group of edges or the other and to draw it back into alignment.

The roughening or corrugation of the roll surface also has a cleaning effect when used in connection with a conveyor belt on the return flight. On the return flight the working face of the belt is exposed to the roll and the corrugations tend to break up any material which may, as is frequently the case with sticky substances like clay, have been formed in a thin, more or less continuous, sheet or film on the belt. The diagonal lines or channels bounded by the corrugations have a scraping effect, to some extent; they also tend to move the material laterally as it is scraped off the belt, and the corrugation tends to cut through any film and thereby assist in removing it.

I claim:

In combination, a conveyor belt, a plurality of troughing idlers having their faces in different planes and adapted to engage the underside of the belt and support the belt in a trough shaped position, the belt engaging surfaces of the idlers in said different planes being provided with a plurality of diamond-shaped corrugations defining a plurality of intersecting diagonal channels inclined to the axis of rotation of the roll and to the direction of movement of the belt, all sides of the diamond-shaped projections being equally sharp.

Signed at Pittsburgh county of Allegheny and State of Penn., this 22 day of March, 1928.

WILLIAM E. PHILIPS.